United States Patent [19]

Sacco et al.

[11] Patent Number: 5,245,142
[45] Date of Patent: Sep. 14, 1993

[54] SWITCH GROUP FOR THE REMOTE CONTROL OF A VEHICLE SEAT ADJUSTABLE VIA ACTUATING DRIVES

[75] Inventors: Bruno Sacco; Joseph Gallitzendörfer; Andreas Langenbeck, all of Sindelfingen; Murat Günak, Ehningen; Erich Karb, Calw, all of Fed. Rep. of Germany

[73] Assignee: Daimler-Benz AG, Fed. Rep. of Germany

[21] Appl. No.: 982,422

[22] Filed: Nov. 27, 1992

Related U.S. Application Data

[63] Continuation of Ser. No. 553,657, Jul. 18, 1990, abandoned.

[30] Foreign Application Priority Data

Jul. 22, 1989 [DE] Fed. Rep. of Germany ....... 3924292

[51] Int. Cl.⁵ .............................................. H01H 9/00
[52] U.S. Cl. .................................... 200/5 R; 200/6 R
[58] Field of Search ............. 200/5 R, 6 R, 6 C, 50 C, 200/52 R; 307/9.1, 10.1-10.7

[56] References Cited

U.S. PATENT DOCUMENTS

| | | | |
|---|---|---|---|
| 4,454,390 | 6/1984 | Gmeiner et al. | 200/6 R X |
| 4,473,724 | 9/1984 | Suzuki | 200/5 R |
| 4,678,872 | 7/1987 | Gutman | 200/5 R |
| 4,695,682 | 9/1987 | Winogrocki | 200/5 R |
| 4,701,629 | 10/1987 | Citroen | 307/10.1 |
| 4,934,750 | 6/1990 | Eichler et al. | 296/37.8 |

FOREIGN PATENT DOCUMENTS

| | | |
|---|---|---|
| 8516069 | 6/1985 | Fed. Rep. of Germany . |
| 3122739 | 2/1986 | Fed. Rep. of Germany . |
| 3609688 | 9/1986 | Fed. Rep. of Germany . |

Primary Examiner—J. R. Scott
Attorney, Agent, or Firm—Evenson, McKeown, Edwards & Lenahan

[57] ABSTRACT

A switch group for the remote control of a vehicle seat adjustable via actuating drives, having two switching elements, which symbolize a seat cushion and a backrest of the vehicle seat, are held in a position relative to one another which corresponds to the use position of the seat, and are arranged so as to be accessible from above on a bearing surface which the user of the seat can reach. The switching element symbolizing the seat cushion is mounted on a horizontal surface portion of the bearing surface. To make the switch group highly suitable for expansion by additional control functions, the bearing surface for the switch group merges behind the switching element symbolizing the seat cushion into a surface portion angled obliquely upwards. The switching element symbolizing the backrest is mounted on the angled surface portion of the bearing surface separately from the associated switching element and a free space for operation sufficient for grasping the switching elements at the sides is present on both sides next to the switch group.

14 Claims, 1 Drawing Sheet

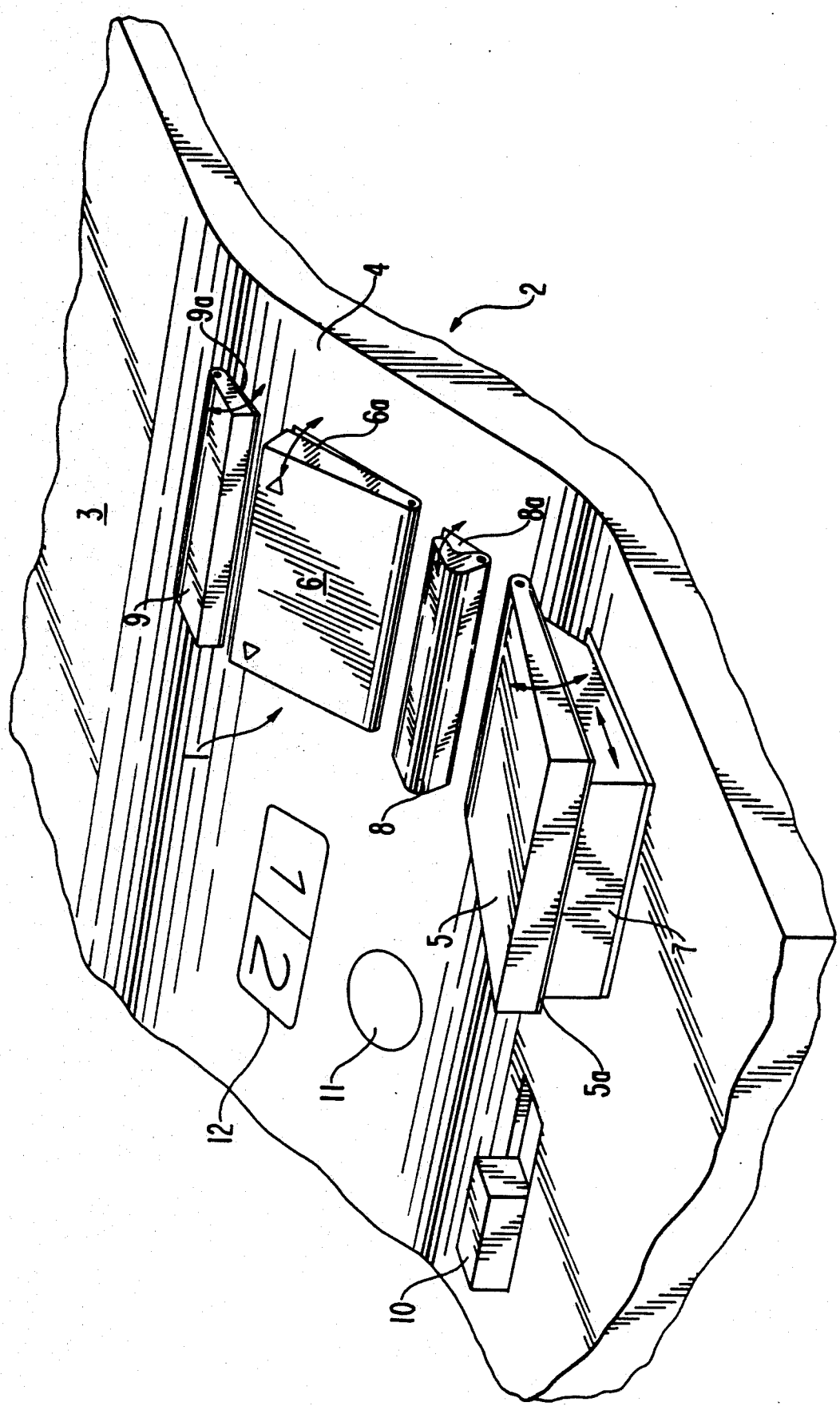

SWITCH GROUP FOR THE REMOTE CONTROL OF A VEHICLE SEAT ADJUSTABLE VIA ACTUATING DRIVES

This is a continuation of application Ser. No. 07/553,657, filed Jul. 18, 1990, now abandoned.

BACKGROUND AND SUMMARY OF THE INVENTION

The present invention relates to a switch group for the remote control of a vehicle seat adjustable via actuating drives, and more specifically, to a switch group having switching elements that symbolize a seat cushion and a backrest of the vehicle seat. These switching elements are held in a position relative to one another which corresponds to the use position of the seat, and are arranged so as to be accessible from above on a bearing surface which the user of the seat can reach. The switching element symbolizing the seat cushion is mounted on the horizontal portion of the bearing surface and a free space for operation sufficient for grasping the switching elements at the sides is present on both sides next to the switch group.

A switch group of this kind, which is made in imitation of the appearance of the vehicle seat even as regards its proportions, is already known, for example, from German Utility Model 8,516,069. The switch group comprises two cuboid switching elements, described in that document, which represent a seat cushion and a backrest of a vehicle seat and are swivel connected to one another via a spindle. This switching element unit is mounted in lateral guides extending parallel to one another and horizontally so as to be longitudinally displaceable on the spindle. A relative mobility of the switching elements, corresponding to the vehicle seat, is thereby provided. Since in their rest position, the switching elements are held in a stable central position and can be moved in opposite directions starting from this central position, to control the adjustment functions of the vehicle seat, a particularly apparent adjustment operation of the vehicle seat is possible via the switch group.

However, over and above the adjustment of the inclination of the backrest, contemporary vehicle seats have further adjustable seat parts, such as the now obligatory head restraint or a lumbar support integrated into a lower portion of the seat back. Due to an increasing awareness of the comfort of the car driver, it should also be possible to perform these further adjustment functions via switch-controllable servo motors. At the same time, for reasons of clear association, it is also advisable to control the additional functions via the switch group associated with the vehicle seat.

The switch group described in the above-referenced German Patent Document can hardly be used to assume further control functions if a comparably apparent operating facility for the additional adjustable seat parts is also aimed for.

An object of the present invention is to provide a switch group that is more suitable for expansion of additional control functions and allows apparent operation of the switch group to remain possible even in the case of expansion.

This and other objects are achieved by the present invention which provides a switch group arrangement for remotely controlling a vehicle seat of a vehicle that is adjustable via actuating drives, the switch group arrangement comprising a bearing surface and switching elements. The bearing surface is formed by a stepped shoulder of a cladding that extends in a longitudinal direction of the vehicle and is arranged laterally next to the vehicle seat. The bearing surface has a horizontal portion and an angled portion merging from the horizontal portion and is angled obliquely upwards from the horizontal portion. The first switching element symbolizes a seat cushion of the vehicle seat, and is mounted on the horizontal portion. The second switching element symbolizes a backrest of the vehicle seat, and is mounted on the angled portion separately from the first switching element. The positions of the first and second switching elements relative to one another correspond to a use position of the vehicle seat. The first and second switching elements are accessible from above by a user of the vehicle seat, with a free space for operation sufficient for grasping the first and second switching elements on their sides being present on both sides of the first and second switching elements.

Since the switch group can be grasped by the operating hand, the side contour of the switch group can be felt upon grasping the switch group, and confusion-proof operation of the switching elements remains possible even without looking.

The bearing surface is formed by a shoulder of a stepped cladding which is arranged laterally next to the vehicle seat. Such a shoulder can, for example, delimit the bottom of a niche in a door panel.

For motor vehicles which have a transmission tunnel, an embodiment of the present invention employs a shoulder in a cover plate of the center console for the arrangement of the switch group. Two switch groups can be mounted on the cover plate, in mirror symmetry to the central longitudinal axis of the motor vehicle for instance. One switch group is associated with the driver's seat and the other switch group is associated with the passenger seat. Given favorable positioning, both switch groups are accessible from the driver's seat, the driver thus being able to take over the adjustment of the passenger seat.

Due to the separate arrangement of the first switching element (symbolizing the seat cushion) from the second switching element (symbolizing the backrest), the first switching element can be mounted at any desired height above the second switching element. As a result, a further switching element can be arranged below the switching element placed at the higher level. This further switching element symbolizes, for example, a lumbar support. In addition, a still further switching element, which symbolizes the head restraint, can be mounted above the switching element placed at the higher level.

To ensure that the lateral contour of the switching elements secured on the angled surface portion can be felt effortlessly, an embodiment of the present invention provides these switching elements with the same gripping width. In addition, in this embodiment the gripping width substantially corresponds to that of the first switching element, which symbolizes the seat cushion.

To improve the touch association of the switching elements, arranged one above the other, an embodiment of the present invention provides a vertical spacing between adjacent switching elements. Also, in an embodiment of the invention, the appearance of the switch group is made more similar to that of the vehicle seat since the switching element symbolizing the seat cushion is mounted in raised fashion on a recessed pedestal.

Favorable conditions as regards installation space are achieved in an embodiment of the present invention in which the switching elements taper in a wedge shape towards one edge side extending in the direction of the switch group.

In an embodiment of the present invention in which the switching elements have a switch base as a change key, a desired operation is also promoted by the wedge shape by a swiveling axis of the switching element extending along the edge side tapered in a wedge shape.

To enable the switching element symbolizing the seat cushion also to be a change key for vertical adjustment of the seat, a sliding key for the longitudinal adjustment of the seat is integrated into the pedestal in an embodiment of the present invention. Also, in an embodiment, a change-over switch is provided in the bearing plate next to the switch group. By means of this change over switch, the control of the driver's seat or the control of the passenger seat from one switch group can be effected. Alternatively, the change-over switch could also be used for the selection of two different control programs for the same vehicle seat.

To further increase the ease of operation, the adjustment of the vehicle seat can be effected automatically in a manner known per se, the adjustment values of several persons being recallable from a seat position memory. The operating and display elements of this electronic storage device are expediently arranged next to the switch group symbolizing the seat in an embodiment of the present invention.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of a switch group constructed in accordance with an embodiment of the present invention.

DETAILED DESCRIPTION OF THE DRAWINGS

FIG. 1 shows a view of a schematically represented switch group 1, which is arranged laterally next to the driver's seat on a center console 2 of a motor vehicle (not shown) and is used for adjusting the driver's seat via servo motors. In accordance with its association with the driver's seat, the switch group 1 is mounted at the left-hand side on a cladding, or cover plate 3, of the center console 2. In a longitudinal region which is accessible to the driver from all possible seat positions, the cover plate 3 has a stepped shoulder 4 at which a rear horizontal plane of the cover plate 3 merges into a downward-directed oblique plane, initially at an angle of, for example, about 45°, before it continues in a vertically offset horizontal plane situated in front of the oblique plane.

A portion of the width of the oblique plane and an adjoining portion of the width of the lower horizontal plane are here used as a bearing surface for the switch group 1, which, in its overall configuration, has the physical appearance of a miniature seat. The principal elements of the switch group 1 are two rectangular switch elements 5 and 6 of corresponding width which are intended to respectively symbolize a seat cushion and a backrest of the vehicle seat. The proportions of the surfaces of these switch elements 5 and 6 are therefore matched approximately to the real proportions of the seat.

To ensure that the switching elements 5 and 6 are held in a position relative to one another which corresponds to the use position of the seat, the switching element 5 symbolizing the seat cushion is arranged a short distance in front of the oblique plane of the shoulder 4 on the horizontal surface portion of the bearing surface while the switching element 6 symbolizing the backrest is arranged above switching element 5 on the inclined surface portion of the bearing surface. Since the switching elements 5 and 6 are each held with their rearward surface resting on the bearing surface, the angle of incidence of switching element 6 to switching element 5 is principally determined by the angle included between the horizontal and the inclined surface portion of the bearing surface.

In order to achieve an appearance which is more similar to the seat despite this obtuse angle of about 135°, switching element 5 is arranged raised on a pedestal 7 which is recessed relative to the edge sides of switching element 5 and thereby gives the impression of a seat underframe. In addition, the switching elements 5 and 6 taper in a wedge shape over their entire longitudinal extension. Switching element 5 tapers from the front towards the rear and switching element 6 tapers from the top towards the bottom. As a result, the angle included between the upward-facing surface of switching element 5 and the forward-facing surface of switching element 6 is markedly steeper than the angle of incidence predetermined by the bearing surface.

Since the switching elements 5 and 6 are mounted separately from one another, switching element 6 can be arranged vertically offset above switching element 5 to such an extent that a further switching element 8 can be arranged between them on the inclined surface portion. This switching element 8 symbolizes a lumbar support and in imitation of its real extension on the vehicle seat, comprises a narrow bar element which extends in the direction of the width of switching element 6, parallel to the lower edge of the switching element 6.

As seen over its constant cross-section, switching element 8, the length of which corresponds to the width of switching element 6, likewise has a wedge shape and is secured independently of switching elements 5 and 6, between these switching elements 5 and 6.

Arranged on the inclined surface portion of the bearing surface, above and separated from the switching element 6, is a further narrow switching element 9 which, with a length corresponding to the width of switching element 6, extends along the upper edge of the latter. As seen over its constant crosssection, switching element 9 also has a wedge shape, tapering from the bottom towards the top. Since switching element 9 is intended to symbolize a head restraint of the vehicle seat, its vertical extension is matched approximately proportionately to the vertical extension of a head restraint.

The operation of the switch group 1 symbolizing overall a vehicle seat is apparent since switching element 8 for the lumbar support and switching element 9 for the head restraint are situated in an arrangement within the switch group 1 which corresponds to their positions of installation on the vehicle seat. The operating action is from above, the thumb and the index finger of an operating hand having to be spread far enough to allow each of the switching elements 5, 6, 8 and 9 to be grasped on both sides. Since the end faces of all the switching elements 5, 6, 8 and 9 lie in a common vertical longitudinal plane on both sides, grasping is possible without problems. The operating action accordingly presupposes a sufficient free space for operation on both sides next to the switch group 1.

The association can be made without even looking at the switch group 1, by touch, it being possible for the switching elements 5, 8, 6 and 9 in each case to exhibit a vertical spacing, thereby making it easier to distinguish the switching elements 5, 8, 6 and 9 from one another.

The obviousness of switch operation is further increased by the fact that the switching elements 5, 8, 6 and 9 are movable in the same direction of movement as the associated parts of the vehicle seat, in each case for controlling the adjustment functions. For this purpose the switching elements 5, 8, 6 and 9 are pivoted on an associated switch base 5a, 8a, 6a and 9a, respectively, in each case along their tapered edge side extending in the direction of the width of the switch group 1, and held in a stable central position. From this central position, they can be optionally depressed in the direction of the bearing surface or swivelled up in the opposite direction of movement. With their respective switch base 5a, 8a, 6a and 9a, they thus form change keys of known design. A sliding key switch having a stable central position via which the seat adjustment in the longitudinal direction L of the vehicle can be controlled is furthermore provided between switch base 5a and the pedestal 7. Thus, switching element 5 can be used for the longitudinal adjustment of the vehicle seat by longitudinal displacement relative to the pedestal 7 and for vertical or slope adjustment of the vehicle seat by swivelling up or down.

By swivelling switching element 8 forward out of its central position, it is possible to move the lumbar support out and, when it is swivelled back, to retract it again or to adjust its amplitude steplessly.

When switching element 6 is swivelled up, a steeper inclination of the seat back is approached and when it is swivelled down a shallower inclination of the seat back is approached. Finally, by swivelling switching element 9 up and down, an advance of the head restraint in the same direction can be effected.

In order to be able to make use of additional adjustment functions of the vehicle seat via the switch group 1, a changeover switch 10 is integrated into the horizontal surface portion of the bearing surface on the right-hand side next to the pedestal 7 at a sufficient distance. This change-over switch 10 is a change-over switch of customary slidably guided design via which two different function programs can be selected.

In one switch position, a so-called standard program is selected, which here comprises all the adjustment functions described apart from the lumbar support. By switching over the change-over switch 10, a special orthopaedic program is selected which only then activates switching element 8 and in which the adjustment functions of switching elements 5 and 6 are overlaid by other adjustment functions.

Instead of the longitudinal seat adjustment, in the course of a sliding movement of switching element 5 the height of the seat cushion is now adjusted and, instead of the inclination of the back an extendable shoulder support or the advance of side wings arranged on the side of the seat back is now adjusted via switching element 6. Further adjustment possibilities are also conceivable on switching element 5 and switching element 9.

A sensor control 11 is set into the inclined surface portion of the bearing surface next to switching element 8, likewise at a distance to the right of the switch group 1. By pressing on the sensor control, a so-called memory storage of the present seat position can be achieved, thereby enabling the vehicle seat, after recall, to move automatically into a plurality of stored positions. The sensor control 11 is complemented by a monitoring display 12 located above the latter, which numerically indicates the memory location selected.

In addition to the advantages already explained, particularly when arranged on a cover plate 3 of a center console 2, the switch group 1 offers the advantage of simple connection via cables to the vehicle's electrical system. The excessive cable lengths necessary when the switches are arranged on the vehicle doors can be markedly reduced. The switching elements of the switch group 1 can in each case be connected through an associated opening in the cover plate 3, which is covered by the switching elements themselves after their installation.

In addition, when repair is needed, only that switching element of the switch group which is affected need be replaced, with the result that corresponding repairs can be carried out at a favorable cost.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A switch group for remotely controlling a vehicle seat of a vehicle that is adjustable via actuating drives, comprising:

a bearing surface formed by a stepped shoulder of a cladding that extends in a longitudinal direction of the vehicle and which is arranged laterally next to the vehicle seat, the bearing surface having a horizontal portion and an angled portion extending from the horizontal portion and angled obliquely upwards from the horizontal portion;

a first switching element symbolizing a seat cushion of the vehicle seat, said first switching element being mounted on the horizontal portion and having a shape and proportions which resemble a seat cushion of the vehicle seat, including lateral side portions corresponding to lateral sides of said seat cushion;

a second switching element symbolizing a backrest of the vehicle seat, said second switching element being mounted on the angled portion separately from the first switching element and having a shape and proportions which resemble a backrest of the vehicle seat, including lateral side portions corresponding to lateral sides of said backrest;

wherein the positions of the first and second switching elements relative to one another correspond to a use position of the vehicle seat, the first and second switching elements being accessible from above by a user of the vehicle seat, and having free space on both sides thereof sufficient to permit said user to grasp said first and second switching elements from above, on said lateral side portions thereof.

2. The switch group according to claim 1, wherein the cladding is a cover plate of a center console of the vehicle.

3. The switch group according to claim 1, wherein the angled portion of the bearing surface is considerably higher than the second switching element and further comprising at least one further switching element mounted in the direction of vertical extension of the second switching element.

4. The switch group according to claim 3, wherein the second switching element is arranged vertically offset relative to the first switching element and the at least one further switching element includes a narrow third switching element which symbolizes a lumbar support of the vehicle seat, and is mounted on the angled portion below the second switching element.

5. The switch group according to claim 4, wherein the at least one further switching element includes a narrow, fourth switching element, which symbolizes a head restraint of the vehicle seat, and is mounted on the angled portion above the second switching element.

6. The switch group according to claim 3, wherein the width of all of the switching elements which are mounted on the angled portion of the bearing surface substantially corresponds to the width of the first switching element.

7. The switch group according to claim 3, wherein all of the switching elements that are mounted on the angled portion of the bearing surface are mounted at a vertical distance from one another.

8. The switch group according to claim 1, further comprising a pedestal recessed relative to edge sides of the first switching element, and on which the first switching element rests.

9. The switch group according to claim 3, wherein all of the switching elements that symbolize a seat part taper in a wedge shape towards one of their edge sides extending in the direction of the width of the switch group.

10. The switch group according to claim 9, wherein switching elements are pivoted along their tapered edge sides on an associated switch base, the switching elements being held in a stable central position in the rest condition, said switching elements having switch bases, said switching elements being change keys that can be swivelled out of central positions in opposite directions.

11. The switch group according to claim 8, further comprising a sliding key switch having a stable central position that is integrated into the pedestal.

12. The switch group according to claim 1, further comprising a change-over switch that is integrated into the bearing surface laterally next to the switch elements symbolizing the vehicle seat.

13. The switch group according to claim 12, wherein the change-over switch is a selector switch for two different function programs of the vehicle seat.

14. The switch group according to claim 1, further comprising at least one of a button or a monitoring display of a seat-position memory that is set into the bearing surface laterally next to the switching elements symbolizing the vehicle seat.

* * * * *